(12) United States Patent
Aoyama

(10) Patent No.: US 6,250,777 B1
(45) Date of Patent: Jun. 26, 2001

(54) DOUBLE-FOCUS LENS AND VEHICLE LAMP

(75) Inventor: Toshihiro Aoyama, Utsunomiya (JP)

(73) Assignee: Stanley Electric Co., Ltd., Tokyo (JP)

( * ) Notice: Subject to any disclaimer, the term of this patent is extended or adjusted under 35 U.S.C. 154(b) by 0 days.

(21) Appl. No.: 09/397,872

(22) Filed: Sep. 17, 1999

(30) Foreign Application Priority Data

Sep. 18, 1998 (JP) .................................................. 10-265315

(51) Int. Cl.[7] .............................. F21V 5/00; G02B 17/00
(52) U.S. Cl. ........................ 362/326; 362/520; 362/522; 362/336; 362/332; 362/330; 362/335; 362/339; 362/340; 359/726
(58) Field of Search ..................................... 362/520, 522, 362/336, 332, 330, 335, 339, 340, 338; 359/726

(56) References Cited

U.S. PATENT DOCUMENTS

| 4,608,623 | 8/1986 | Stephano | 362/80 |
|---|---|---|---|
| 4,722,023 | 1/1988 | Arima et al. | 362/80 |
| 5,582,481 | * 12/1996 | Natsume | 362/336 |
| 5,603,561 | * 2/1997 | Ohishi | 362/80 |
| 5,833,355 | * 11/1998 | You et al. | 362/244 |
| 5,836,674 | * 11/1998 | Nishitani et al. | 362/336 |
| 5,975,723 | * 11/1999 | Daumueller et al. | 362/297 |
| 6,097,549 | * 8/2000 | Jenkins et al. | 359/726 |

* cited by examiner

*Primary Examiner*—Sandra O'Shea
*Assistant Examiner*—Anabel Ton
(74) *Attorney, Agent, or Firm*—Morgan, Lewis & Bockius LLP

(57) ABSTRACT

A double-focus lens is disclosed in which double-focus lens cuts (for example, cuts in which elements of the lens cuts formed on one of the surfaces of the lens include convex cuts in a first direction and concave cuts in the direction substantially perpendicular to the first direction) are formed on at least a portion of the lens. A vehicular lamp device can be constructed using the double-focus lens as an outer lens. Accordingly, a vehicular lamp device with a feeling of three-dimensional depth can be realized by using a lens that forms focal points in two locations, i.e., oil the front side of the lens and on the back side of the lens, without sacrificing light distribution characteristics.

27 Claims, 4 Drawing Sheets

FIG. 6
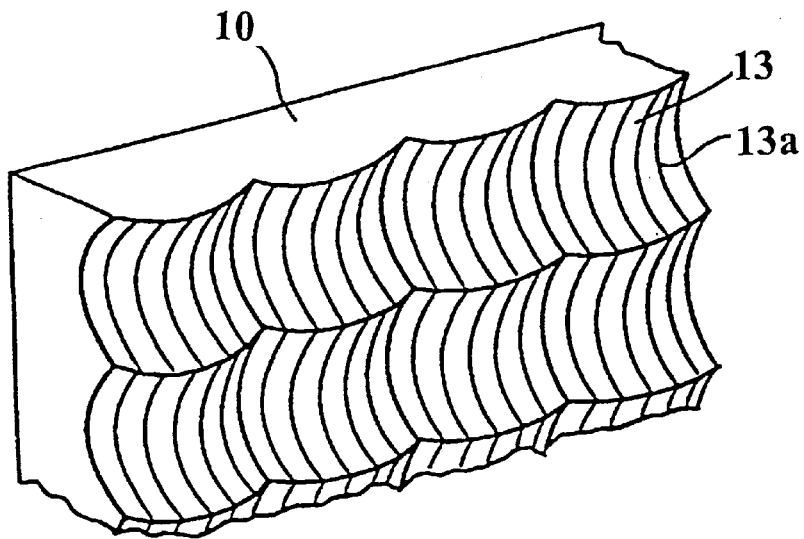
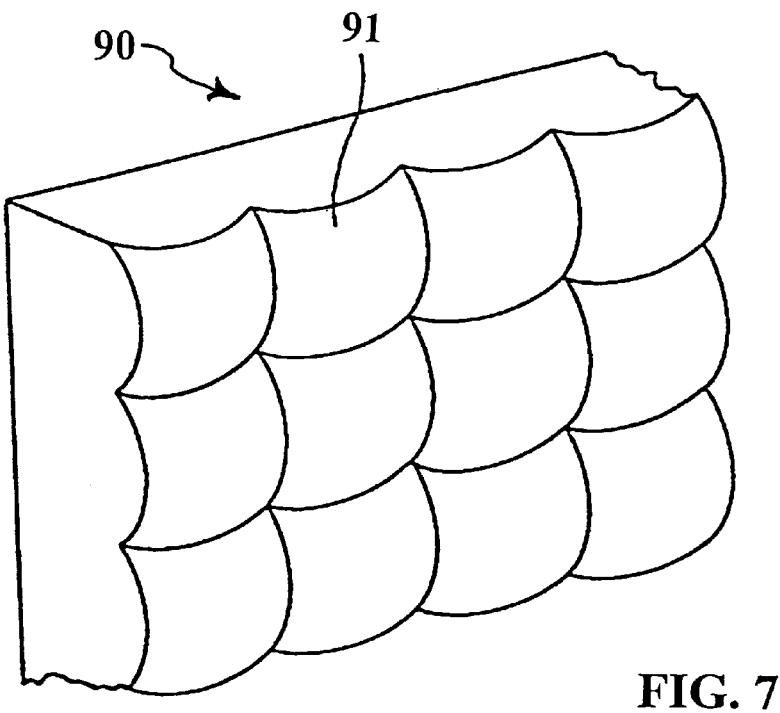
FIG. 7
(CONVENTIONAL ART)

DOUBLE-FOCUS LENS AND VEHICLE LAMP

This application claims the benefit of Japanese Application No.10-265315, filed in Japan on Sep. 18, 1998 and which is hereby incorporated by reference.

BACKGROUND OF THE INVENTION

1. Field of the Invention

The invention relates to a lamp lens device. Specifically, the invention relates to a lamp lens device such as a tail lamp, etc. that can transmit a communicative signal to other drivers and/or to other persons. An object of the invention is to improve the external appearance of a vehicular lamp device, both when the lamp device is lit and when the lamp device is not lit.

2. Discussion of the Related Art

FIG. 7 shows an example of the construction of a lens 90 used in a conventional vehicular lamp device. Light from a light source that is a quasi-point light source such as an incandescent light bulb, etc., strikes an inner lens (not shown in the figures) on which Fresnel cuts are formed, so that the light is transformed into parallel light rays. The parallel light rays strike a lens 90 on which lens cuts 91 have been formed to achieve appropriate diffusion and obtain desired light distribution characteristics.

Each individual element of the above-mentioned lens cut 91 is formed with a convex lens shape or concave lens shape, and a plurality of lens cuts 91 which are formed with the same curvature and same shape are formed so that the cuts cover the entire surface on the light sources side of the above-mentioned lens 90.

In the conventional lens 90, when the light source is lit, the light is focused at a focal point after passing through the lens 90 where the lens cuts 91 have a convex lens shape. Since the lens cuts 91 have the same curvature and the same shape, the position of this focal point is located on a plane at a predetermined distance in front of the surface of the lens 90 in the illumination direction of vehicle lamp 90.

When the lens 90 is viewed from outside the front side of the vehicle lamp 90 while the light source is not lit, vision is focused by the respective lens cuts 91 at a focal point located on a plane that is a predetermined distance behind the lens 90. Accordingly, when the surface of the lens 90 is viewed from the front, regardless of whether the light source is lit or not lit, the lens 90 as a whole appears to be very planar and does not appear to be of quality construction as a result of the above-mentioned planar focal point. Thus, the lens lacks a feeling of depth and appears to be quickly and cheaply constructed with no forethought to the aesthetic design and appearance of the lamp. Furthermore, similar problems occur when the above-mentioned lens cuts 91 have a concave lens shape.

The lack of a feeling of depth in the conventional lens 90 deprives the designer of the lens from constructing a lens that ties artistic lighting qualities with the functional lighting requirements in a vehicle lamp. Accordingly, the conventional vehicular lamp lens 90 does not fully contribute to an improvement in the design of the vehicle body.

Tail lamps and brake lamps, etc., are signal lamps and therefore their functional requirements are most important. However, since such lamps are components that add to the appearance of a vehicle's external body, it is also important that these lamps contribute to the. aesthetic qualities in the design of the vehicle body.

SUMMARY OF THE INVENTION

The above-mentioned and other problems of the related art can be solved by providing a lens including a lens structure formed of a material that is transparent to light, the lens structure having a front and back surface and a plurality of elements formed on the lens structure, each of the plurality of elements including a convex cut formed in one of the front and back surfaces as viewed in a first cross-sectional direction, and a concave cut formed in the one of the front and back surfaces as viewed from a second cross-sectional direction, wherein the first cross-sectional direction and the second cross-sectional direction are approximately perpendicular to each other.

The above-mentioned and other problems of the related art can also be solved by providing a lamp device including a lamp housing with an opening therein, a lens structure located adjacent the opening in the lamp housing, the lens structure formed of a material that is transparent to light and having a front and back surface, a plurality of elements formed on the lens structure, each of the plurality of elements including a convex cut formed in one of the front and back surfaces as viewed in a first cross-sectional direction, and a concave cut formed in the one of the front and back surfaces as viewed from a second cross-sectional direction, wherein the first cross-sectional direction and the second cross-sectional direction are approximately perpendicular to each other.

The above-mentioned and other problems of the related art can also be solved by providing a lamp device including a lamp housing having an opening therein, a lens structure formed of a material that is transparent to light and located adjacent the opening in the lamp housing, the lens structure having a front and back surface and a plurality of elements formed on the lens structure, each of the plurality of elements including means for double-focusing light passing through the lens structure.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of the specification, illustrate embodiments of the invention and together with the description serve to explain the principles of, the invention.

In the drawings:

FIG. 6 is a partial perspective view of another embodiment of lens of the invention;

FIG. 7 is a partial perspective view of a conventional lens; and

DETAILED DESCRIPTION OF THE PREFERRED EMBODIMENTS

Reference will now be made in detail to the preferred embodiments of the invention, examples of which are illustrated in the accompanying drawing FIGS. 1–6 and 8.

Figure 1:
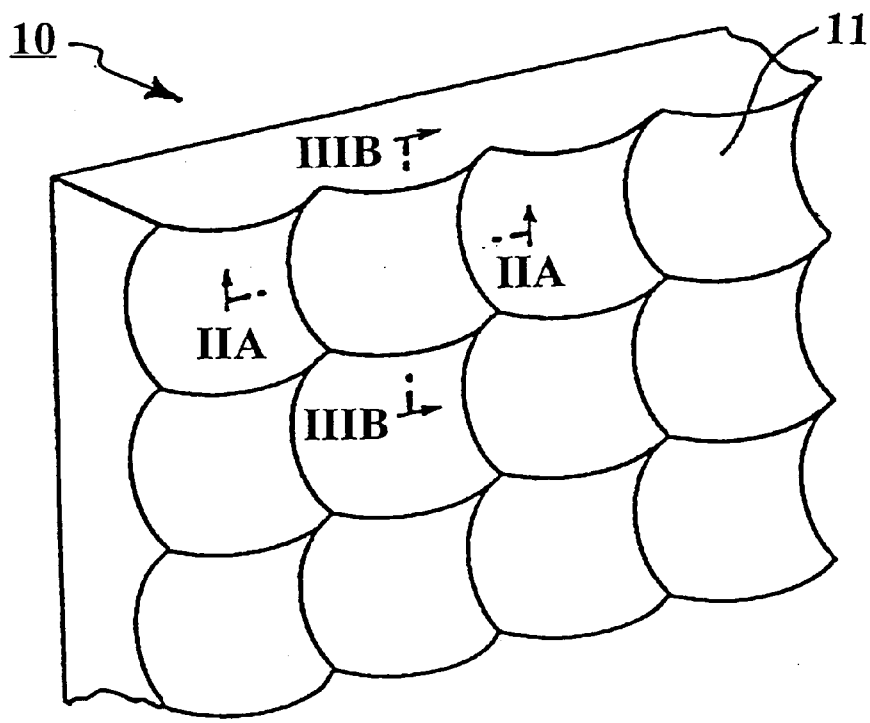
FIG. 1 is a partial perspective view of an embodiment of the double-focus lens of the invention.

FIG. 1 shows a partial perspective view of a double-focus lens 10. The double-focus lens 10 can include lens cuts formed over roughly the entire surface of the lens on the light source aside.

Figure 2:
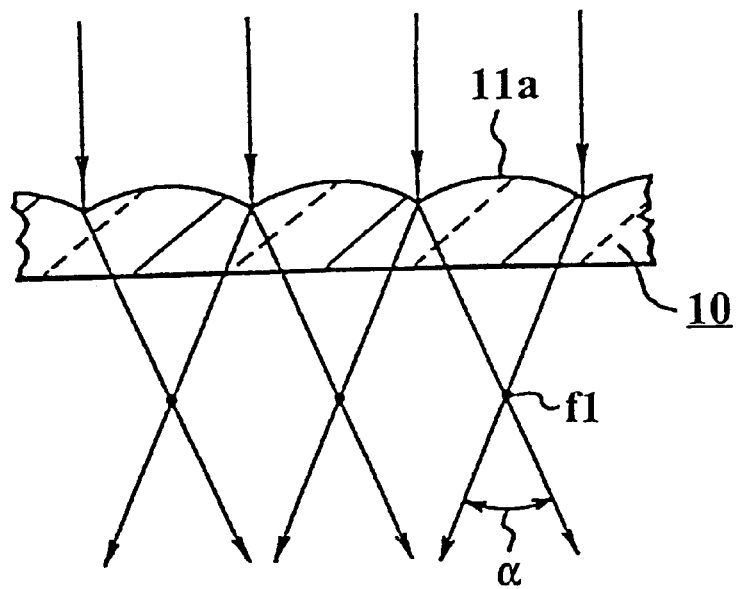
FIG. 2 is a sectional view along line IIA—IIA in FIG. 1.
Figure 3:
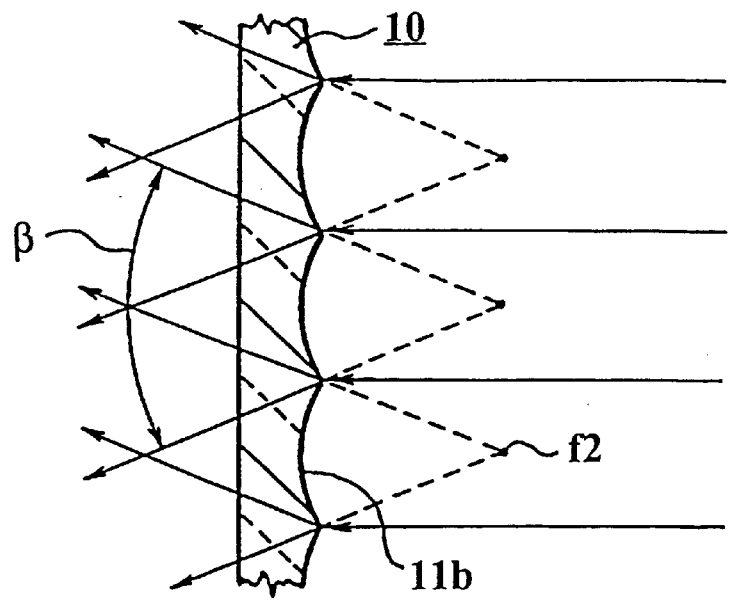
FIG. 3 is a sectional view along line IIIB—IIIB in FIG. 1.

The lens cuts can be formed as double-focus lens cuts 11. Double-focus lens cuts 11 can include convex cuts 11a Hug a convex surface as shown in FIG. 2 in one sectional direction, e. g., in the horizontal sectional direction (IIA—IIA) when the lens 10 is attached to a vehicle body. Furthermore, the cuts can include concave cuts 11b forming a concave surface as shown in FIG. 3 in the sectional direction (IIIB—IIIB) that is substantially perpendicular to the above-mentioned sectional direction (IIA—IIA).

Accordingly, in section (IIA—IIA) as shown in FIG. 2, the double-focus lens cuts 11 are convex cuts 11a, and exhibit the same effect as a convex lens. Thus, for parallel light rays incident on this lens 10, a focal point f1 is formed at a predetermined distance outside the lens 10 after the light passes through the lens 10. Furthermore, after focal point f1 is formed, the light is diffused at an angle $\alpha$. As shown in section (IIIB—IIIB) of FIG. 3, the above-mentioned double-focus lens cuts 11 include concave lens cuts 11b, and exhibit an effect similar to that of a concave lens. Accordingly, for the same parallel light rays as described above, diffusion at an angle $\beta$ occurs when the light rays pass through the lens 10. Thus, a focal point f2 created by the concave lens cuts 11b is formed at a predetermined distance outside the lens 10 prior to the passage of the light through the lens 10, i.e., on the back side of the lens 10.

Figure 8A:
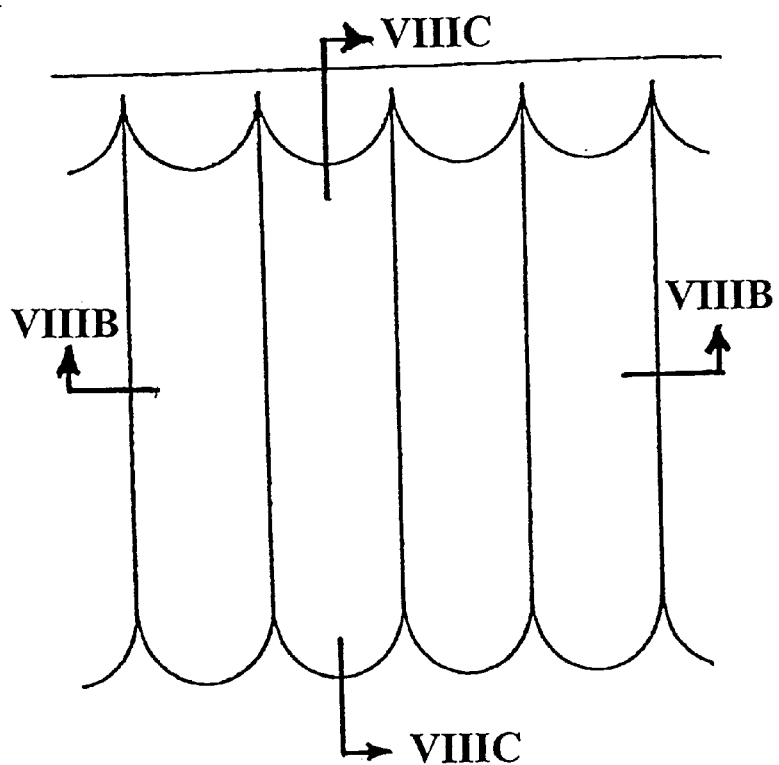
FIGS. 8A–C are a partial perspective view, a sectional view along line VIIIB—VIIIB of FIG. 8A, and a sectional view along line VIIIC—VIIIC of FIG. 8A, respectively of another embodiment of the invention.
Figure 8B:
Figure 8C:
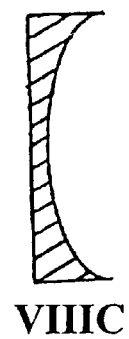

FIG. 8 is a diagram which illustrates the external appearance of one element of a double-focus lens. As is shown in FIGS. 2 and 3, a single element can have a shape which is curved in a convex manner in cross section, and in which the convex lens as a whole is curved in a concave manner in longitudinal section. The lens of the invention can be constructed by a plurality of such elements.

If the angle $\alpha$ at which diffusion is effected by the convex cuts 11a in section (IIA—IIA) is and the angle $\beta$ at which diffusion is effected by the concave cuts 11b in the section (IIB—IIB) are set at substantially the same angle, the double-focus lens cuts 11 of the invention can perform similar to conventional convex (or concave) lens cuts. In other words, it is possible to form light distribution characteristics in the same manner as in the above-mentioned conventional example.

However, in the case of the double-focus lens cuts 11 of the invention, there is a double focus with focal points f1 and f2 located in two places: in front of the lens 10, and in back of the lens 10, with respect to the direction of illumination. Accordingly, it appears as though light is being radiated from two places, i.e., from the focal point f1 and the focal point f2. The sensation of depth is thus increased in the lens and lamp. Furthermore, even when the lens 10 is viewed when the lamp is not lit, e.g., in the daytime, etc., a sensation of depth similar to that experienced when the lamp is lit is experienced as a result of the two focal points f1 and f2.

Figure 4:
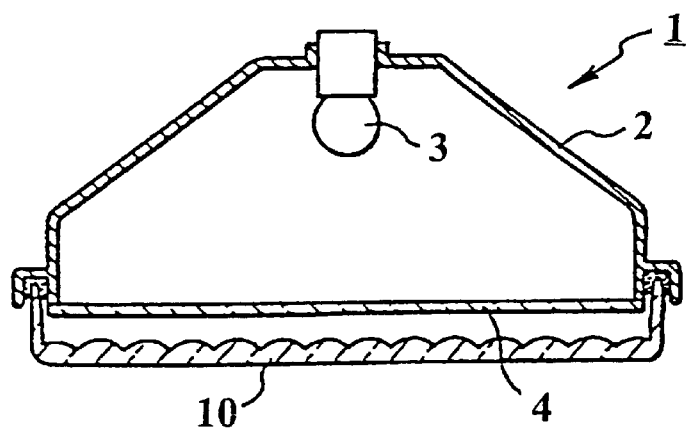
FIG. 4 is a sectional view of a vehicular lamp device equipped with a lens according to an embodiment of the invention.

FIG. 4 shows a vehicular lamp device 1 with double focus lens 10. In this vehicular lamp device 1, a light source 3 which is a quasi-point light source such as an incandescent light bulb, etc., is installed inside a housing 2. Light from the light source 3 is converted into parallel light rays by means of an inner lens 4 on which Fresnel cuts, etc., are formed. The parallel light rays strike the lens 10.

The invention includes a vehicular lamp device 1 which has a feeling of luxury, quality and depth not obtainable in conventional products. The feelings of luxury, quality and depth can be obtained by altering the construction of the lens 10 without changing the basic construction of the vehicular lamp device 1 from that of a conventional vehicular lamp device.

In other words, one element of the lens 10 can have two functions, i.e., collecting and diffusing light rays, and functioning of a vehicular lamp device can be insured by the lens actions of the respective elements. A sense of depth or three-dimensional feeling is improved by including two focal points. A vehicle lamp including a lens 10 makes a significant contribution to the improvement in design of the vehicle body's external appearance.

As stated above, the invention can include a device in which convex cuts 11a appear in the horizontal section of the lens and concave cuts 11b appear in the vertical section of the lens as viewed when the vehicular lamp device 1 is attached to a vehicle. However, the concave-convex orientation of lens cuts 11 may be reversed. Furthermore, the individual elements of the double-focus lens cuts 11 are described above as being formed with a rectangular shape. However, this shape could also be other different shapes such as hexagonal, parallelpiped, cubed, square, rectangular etc.

Figure 5:
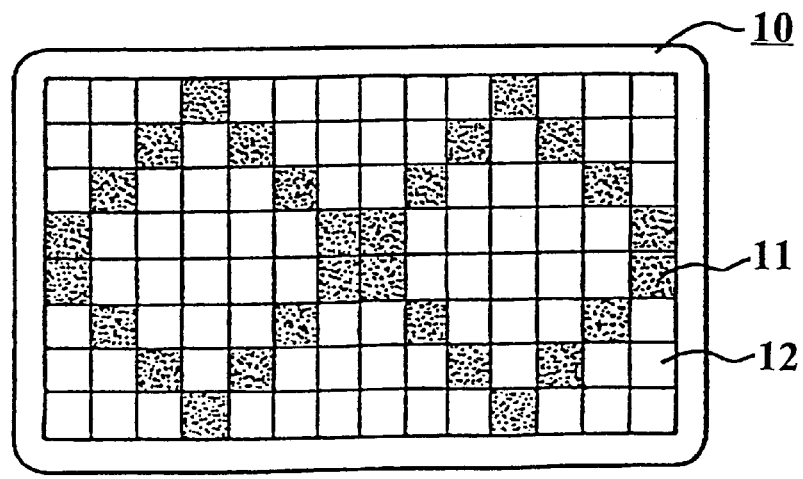
FIG. 5 is a front view of another embodiment of the invention.

FIG. 5 shows another embodiment of the lens 10 of the invention. In the embodiments of the invention described above, the double-focus lens cuts 11 were described as being over the entire surface on the light source side of the lens 10. In the embodiment shown in FIG. 5, lens cuts 11 are mixed with conventional lens cuts 12 having a convex or cylindrical shape, etc.

In the embodiment of FIG. 5 the mixture ratio of lens cuts 11 and cuts 12 and the positioning of the cuts, etc., may be freely set without deteriorating the required performance characteristics for the vehicle lamp. Thus, double-focus lens cuts 11 can be arranged in the shape of a vehicle model name or mark, etc. and the model name or mark, etc., will appear to be floating or recessed as a result of the difference in appearance of the double-focus lens cuts 11 and conventional lens cuts 12. Alternatively, the model name, etc., may be displayed by means of the conventional lens cuts 12 to achieve a different and unique appearance. Accordingly, a vehicular lamp device 1 with a novel design can be obtained.

FIG. 6,shows still another embodiment of the lens 10 of the invention. In the preceding embodiments, both the convex cuts 11a and concave cuts 11b of the double-focus lens cuts 11 were formed with a smooth curved such as a circular arc, etc. However, the invention is not limited to such a shape.

Specifically, in the embodiment of FIG. 6, convex break-line cuts 13a are used instead of the convex cuts 11a in one sectional direction of double-focus lens cuts 13. The convex break line cuts 13a form a front surface edge of the lens 10 and can be combined to form a convex shape as a whole. Accordingly, the parallel light rays incident on the lens 10 are directed in an illumination direction as a radial bundle of light rays intersecting at one point, so that desired light distribution charactertstics are obtained.

As a result of the added use of the convex break-line cuts 13a, a large change in visual perception is obtained in addition to the effect of the double focus lens described above. Accordingly, the lens embodiment shown in FIG. 6 can be used in vehicle lamps to further enhance design alterations.

Furthermore, in another embodiment of the invention, it is possible to set the shape appearing in the other sectional direction as concave break-line cuts 13b (not shown in the figures) in which break lines that form an overall concave shape are formed. The concave break line cuts 13b form a front surface edge of the lens 10 and can be combined to form a concave shape as a whole, It is possible to use break-line cuts (not shown in the figures) in both the first and second sectional directions as shown in FIGS. 2 and 3 as well as other sectional directions.

The lens cuts 11, 11a, 11b and/or break line cuts 13a and 13b are preferably formed in die back surface of the lens adjacent the light source. Lens cuts formed on the back surface of the lens can be effectively sealed within the lamp housing away from the lamp's exterior conditions, thus preventing airborn dust or water from collecting in the lens cuts and affecting the light distribution characteristics of the lamp. However, one or all of the lens cuts 11, 11a, 11b, 13a and/or 13b can be located in the front surface of the lens that faces away from the lamp's light source without departing from the spirit and scope of the invention. For example, a lamp with a lens having front surface lens cuts 11 can be provided with a separate dust and water covering that would permit the lens to include lens cuts 11 in its front surface without diminishing the lamps light diffusion characteristics.

The invention can be a double-focus lens in which double-focus lens cuts (for example, cuts including elements of the lens cuts formed on one of the surfaces of the lens as convex cuts in one direction and as concave cuts in a direction substantially perpendicular to the first direction) are formed on at least a portion of the lens. A vehicular lamp device using a double-focus lens as an outer lens can also be constructed. Accordingly, a vehicular lamp device with, a feeling of three dimensional depth can be realized by creating focal points formed in two locations, i.e., on the front side of the lens and on the back side of the lens, without sacrificing light distribution characteristics. Thus, because the invention makes it possible to create unique and artistic lamp designs without decreasing the operating characteristic of the lamp, the invention has an extremely superior effect in improving the aesthetic quality of vehicular lamp devices.

What is claimed is:

1. A lens, comprising:
    a lens structure formed of a material that is transparent to light, said lens structure having a front and back surface; and
    a plurality of elements having a continuous element surface formed in at least a portion of said one of said front and back surface, each of said plurality of elements including,
        a convex cross-section as viewed in a first direction, and
        a concave cross-section as viewed from a second direction, wherein said first direction and said second direction are approximately perpendicular to each other.

2. The lens as claimed in claim 1, wherein said elements are capable of double-focusing light transmitted through said lens.

3. The lens as claimed in claim 1, wherein at least one of said elements is formed as one of the group consisting of a cube, a hexagon, a rectangle and a parallelpiped structure.

4. The lens as claimed in claim 1, further comprising a plurality of second elements formed in said lens structure.

5. The lens as claimed in claim 1, wherein the lens includes a first focal point and a second focal point.

6. The lens as claimed in claim 5, wherein said first focal point and second focal point are located on opposite sides of the lens.

7. The lens as claimed in claim 1, wherein one of said concave cut and said convex cut is located in said back surface of said lens, and said back surface is configured to be adjacent a light source.

8. A lamp device, comprising:
    a lamp housing with an opening therein;
    a lens structure located adjacent said opening in said lamp housing, said lens structure formed of a material that is transparent to light and having a front and back surface;
    a plurality of elements having a continuous element surface formed in at least a portion of said one of said front and back surface, each of said plurality of elements including, a convex cross-section as viewed in a first direction, and a concave cross-section as viewed from a second direction, wherein said first direction and said second direction are approximately perpendicular to each other.

9. The lamp as claimed in claim 8, wherein said lamp is configured to be attached to a vehicle.

10. The lamp as claimed in claim 8, wherein said elements are capable of double-focusing light transmitted through said lens structure.

11. The lamp as claimed in claim 8, wherein at least one of said elements is formed as one of the group consisting of a cube, a hexagon, a rectangle and a parallelpiped structure.

12. The lamp as claimed in claim 8, further comprising a plurality of second elements formed in said lens structure.

13. The lamp as claimed in claim 8, wherein said lens includes a first focal point and a second focal point.

14. The lamp as claimed in claim 13, wherein said first focal point and second focal point are located on opposite sides of said lens.

15. The lamp as claimed in claim 8, wherein one of said concave cut and said convex cut is located in said back surface of said lens, and said back surface is configured to be adjacent a light source.

16. A lamp device, comprising:
    a lamp housing including an opening therein;
    a lens structure formed of a material that is transparent to light and located adjacent said opening in said lamp housing, said lens structure having a front and back surface; and
    a plurality of elements having a continuous element surface formed in at least a portion of one of said front and back surface, each of said plurality of elements including means for double-focusing light passing through said lens structure.

17. The lamp as claimed in claim 16, wherein at least one of said elements is formed as one of the group consisting of a cube, a hexagon, a rectangle and a parallelpiped structure.

18. The lamp as claimed in claim 16, Further comprising a plurality of second elements formed in said lens structure.

19. The lamp as claimed in claim 16, wherein said lamp housing is configured for attachment to a vehicle.

20. The lamp as claimed in claim 16, wherein said means for double-focusing light passing through said lens includes a plurality of concave and convex cuts located in one of said front and back surfaces of said lens structure.

21. The lamp as claimed in claim 20, wherein said convex cuts are formed in one of said front and back surfaces as viewed in a first cross-sectional direction, and said concave cuts are formed in said one of said front and back surfaces as viewed from a second cross-sectional direction, wherein said first cross-sectional direction and said second cross-sectional direction are approximately perpendicular to each other.

22. The lamp as claimed in claim 16, wherein said lens includes a first focal point and a second focal point.

23. The lamp as claimed in claim 22, wherein said first focal point and second focal point are located on opposite sides of said lens.

24. The lamp as claimed in claim 16, wherein said plurality of elements are located in said back surface of said lens, and said back surface is configured to be adjacent a light source.

25. The lens as claimed in claim 1, wherein said continuous element surface is saddle-shaped.

26. The lens as claimed in claim 8, wherein said continuous element surface is saddle-shaped.

27. The lens as claimed in claim 21, wherein said lens surface is saddle-shaped.

* * * * *